(12) United States Patent
Zhan et al.

(10) Patent No.: US 11,335,101 B2
(45) Date of Patent: May 17, 2022

(54) LOCATING ELEMENT DETECTION METHOD, DEVICE AND MEDIUM

(71) Applicant: BEIJING BAIDU NETCOM SCIENCE AND TECHNOLOGY CO., LTD., Beijing (CN)

(72) Inventors: Bo Zhan, Beijing (CN); Shenghao Hu, Beijing (CN); Ye Tian, Beijing (CN); Cong Chen, Beijing (CN); Zhenyu Zhao, Beijing (CN); Chen He, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/076,324

(22) Filed: Oct. 21, 2020

(65) Prior Publication Data
US 2021/0224562 A1 Jul. 22, 2021

(30) Foreign Application Priority Data
Jan. 21, 2020 (CN) .......................... 202010072016.9

(51) Int. Cl.
*G06V 20/58* (2022.01)
*G06V 20/56* (2022.01)

(52) U.S. Cl.
CPC ............ *G06V 20/586* (2022.01); *G06V 20/58* (2022.01); *G06V 20/588* (2022.01)

(58) Field of Classification Search
CPC .......... G06K 9/00812; G06K 9/00798; G06K 9/00805; G06K 2009/3225; G06K 9/3216; G06K 9/6271; G06K 9/00791; G06K 9/342; G06K 9/344; G06K 9/6218; G06K 9/6268; G06K 9/4604; G06K 9/00362; G06K 9/00302; G06K 9/00664; G06K 9/00671; G06K 9/00771; G06K 9/00335;
(Continued)

(56) References Cited

U.S. PATENT DOCUMENTS

2018/0124230 A1* 5/2018 Muthukumar .......... G06F 1/166
2019/0325580 A1* 10/2019 Lukac ....................... G06T 7/12
(Continued)

FOREIGN PATENT DOCUMENTS

KR 20190076815 A 7/2019

OTHER PUBLICATIONS

Extended European Search Report for Application No. 20214915.9, dated Jun. 9, 2021, 10 pages.
(Continued)

*Primary Examiner* — Nimesh Patel
(74) *Attorney, Agent, or Firm* — Fay Sharpe LLP (57) ABSTRACT

The present disclosure provides a locating element detection method, device and medium, and relates to object detection technologies and is applicable for autonomous parking scenarios. The method includes: obtaining a circular-scanning stitched image around a vehicle; detect the circular-scanning stitched image to determine at least one locating element existing on ambient ground of the vehicle and a semantic type to which each pixel on the circular-scanning stitched image belongs; and performing matching and fusion on the at least one locating element based on the semantic type to obtain a locating element detection result.

13 Claims, 3 Drawing Sheets

(58) Field of Classification Search
CPC ........... G06K 9/00013; G06K 9/00208; G06K 9/3233; G06K 9/52; G06K 2009/3291; G06K 9/00201; G06K 9/00248; G06K 9/00288; G06K 9/00369; G06K 9/00637; G06K 9/00778; G06K 9/00818; G06T 2207/30252; G06T 2207/30244; G06T 2207/20084; G06T 7/74; G06T 7/0002; G06T 7/70; G06T 7/10; G06T 3/4038; G06T 2207/20221; G06T 2207/20081; G06T 2207/30264; G06T 17/05; G06T 19/003; G06T 2200/24; G06T 17/00; G06T 2207/10016; G06T 2207/30236; G06T 15/205; G06T 19/20; G06T 2200/04; G06T 2207/10024; G06T 2207/20212; G06T 2210/21; G06T 2210/61; G06T 7/246; G06T 7/292; G06T 7/37; G06T 7/80; G06T 2207/30132; G06T 7/215; G06T 7/55; B60W 40/02; B60W 30/06; B60W 60/0011; B60W 2050/0052; B60W 2420/42; B60W 2050/0005; B60W 2420/52; B60W 2554/00; B60W 10/18; B60W 2710/18; B60W 30/09; B60W 10/04; B60W 10/10; B60W 2050/146; B60W 30/08; G06N 3/08; G06N 20/00; G06N 5/025; B60Y 2300/06; H04W 4/029; H04W 4/021; H04W 4/38; H04W 24/02; G08G 1/0116; G08G 1/0112; G08G 1/0133; G08G 1/0141; G08G 1/0145; G08G 1/08; G08G 1/0965; G08G 1/096725; G08G 1/166; G08G 1/205; G08G 1/096708; G08G 1/16; G08G 1/017; G08G 1/04; G08G 1/096716; G08G 1/096783; G08G 1/096791; G05D 2201/0213; G05D 1/0287; G05D 1/0016; G05D 1/0038; G05D 1/0094; G05D 1/0231; G05D 1/0248; G05D 1/0276; G05D 1/0297; G05D 1/0088; G05D 1/0214; G06V 20/586; G06V 20/58; G06V 20/588; G06V 10/245; G06V 10/82; G06V 20/56; G06V 10/267; G06V 30/153

See application file for complete search history.

(56) References Cited

U.S. PATENT DOCUMENTS

| 2019/0332893 | A1* | 10/2019 | Roy Chowdhury ........................ G06K 9/00812 |
| 2020/0284607 | A1* | 9/2020 | Mangai .............. G01C 21/3647 |
| 2021/0192196 | A1* | 6/2021 | Bagwell ................. G06N 20/00 |
| 2021/0223789 | A1* | 7/2021 | Chen .................. G01C 21/3685 |

OTHER PUBLICATIONS

Alexander Kirillov et al., "Panoptic Segmentation", Jun. 15, 2019 IEEE/CVF Conference on Computer Vision and Pattern Recognition, 10 pages.

Liuyuan Deng et al., "Restricted Deformable Convolution based Road Scene Semantic Segmentation Using Surround View Cameras", IEEE Transactions of Intelligent Transportation Systems, Sep. 16, 2019, 13 pages.

Chulhoon Jang, "Semantic segmentation-based parking space detection with standalone around view monitoring system", Machine Vision and Applications (2019), CrossMark, Oct. 31, 2018, 11 pages.

Di Feng et al., "Deep Multi-Modal Object Detection and Semantic Segmentation for Autonomous Driving: Datasets, Methods, and Challenges", IEEE Transaction on Intelligent Transportation Systems, vol. 22, No. 3, Mar. 2021, 20 pages.

Office Action for Korean Application No. 10-2021-0006649, dated Jan. 11, 2022, 6 pages.

* cited by examiner

LOCATING ELEMENT DETECTION METHOD, DEVICE AND MEDIUM

CROSS REFERENCE TO RELATED APPLICATION

This application is based upon and claims a priority to Chinese Patent Application No. 202010072016.9, filed on Jan. 21, 2020, the entire contents of which are incorporated herein by reference for all purposes.

TECHNICAL FIELD

The present disclosure relates to a field of visual locating technologies, especially object detection technologies, and more particularly, to a locating element detection method, a device and a medium.

BACKGROUND

Visual locating system is applied more widely to fields like automatic driving. The visual locating system is configured to resolve a pose of an autonomous vehicle in real time based on information obtained by a camera, which is a key premise for movement of the autonomous vehicle.

Currently, there are mainly two methods for the visual locating system to obtain visual information.

The first method is visual simultaneous localization and mapping (SLAM) scheme. In the scheme, environment perception is realized based on images collected by the camera, a traditional image algorithm is applied to extract key points in the images, and self-positioning information calculation is executed based on matching relation of the key points in multiple image frames. However, this method can only be applied to a static scene with sufficient illumination and obvious environmental texture characteristics, which is poor in detection robustness of traditional visual features, and it is difficult to obtain stable and high-precision detection results.

The second method is a method of identifying artificially customized locating identifiers, that is, by detecting specific identifiers in the image collected by the camera, accurate 3D locations and directions of the locating identifiers relative to the camera can be rapidly calculated. In this case, the algorithm implementation is relatively simple, but a large amount of specific identifiers need to be customized and arranged in the scene, and subsequent maintenance cost is high, thus this method is not suitable as a general solution in any scene.

SUMMARY

Embodiments of the present disclosure provide a locating element detection method, a device and a medium.

In a first aspect, embodiments of the present disclosure provide a locating element detection method. The method includes: obtaining a circular-scanning stitched image around a vehicle; detecting the circular-scanning stitched image to determine at least one locating element existing on ground around the vehicle and a semantic type of each pixel on the circular-scanning stitched image; and performing matching and fusion on the at least one locating element based on the semantic type to obtain a locating element detection result.

In a second aspect, embodiments of the present disclosure provide a locating element detection apparatus. The locating element detection apparatus includes: an image obtaining module, a locating element detecting module and a matching and fusing module.

The image obtaining module is configured to obtain a circular-scanning stitched image around a vehicle.

The locating element detecting module is configured to detect the circular-scanning stitched image to determine at least one locating element existing on ground around the vehicle and a semantic type of each pixel on the circular-scanning stitched image.

The matching and fusing module is configured to perform matching and fusion on the at least one locating element based on the semantic type to obtain a locating element detection result.

In a third aspect, embodiments of the present disclosure provide an electronic device. The electronic device includes: fisheye cameras around the electronic device, configured to collect images; at least one processor; and a memory communicatively connected to the at least one processor. The memory stores instructions executable by the at least one processor, and when the instructions are executed by the at least one processor, the at least one processor is caused to implement the locating element detection method according to any one of the embodiments of the present disclosure.

In a fourth aspect, embodiments of the present disclosure provide a non-transitory computer-readable storage medium storing computer instructions, in which the computer instructions are used to make a computer implement the locating element detection method according to any one of the embodiments of the present disclosure.

Additional effects of the above-mentioned optional manners will be described below in combination with specific embodiments.

BRIEF DESCRIPTION OF THE DRAWINGS

The accompanying drawings are used to better understand the solution, and do not constitute a limitation on the application, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

Figure 1:
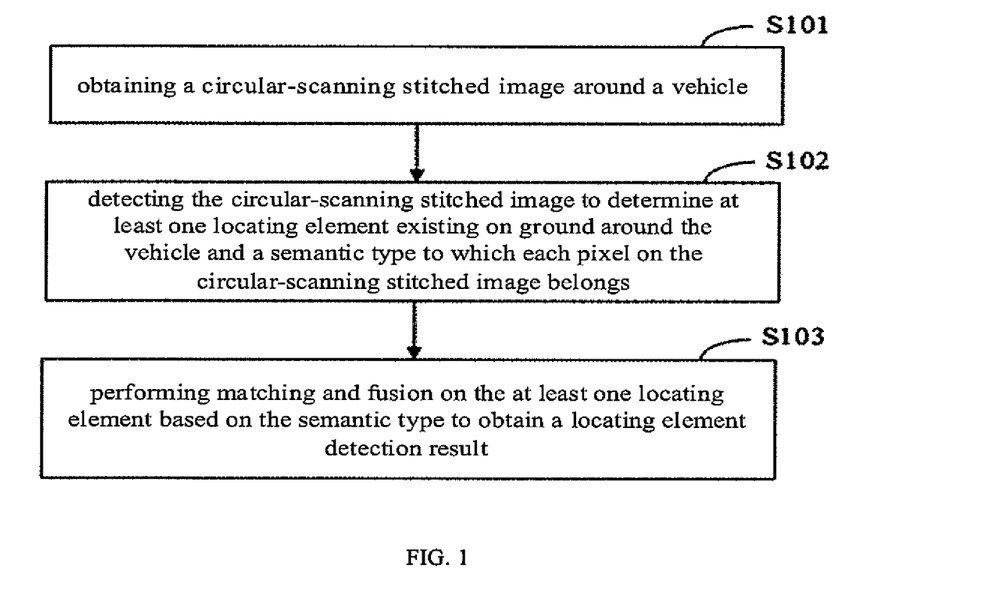
FIG. 1 is a flowchart of a locating element detection method according to Embodiment 1 of the present disclosure.

FIG. 1 is a flowchart of a locating element detection method according to Embodiment 1 of the present disclosure. This embodiment may be applicable for a situation where a vehicle detects a locating element to locate the vehicle in a scene of autonomous parking, such as autonomous parking in an indoor parking lot. The method is implemented by a locating element detection apparatus, which is implemented by software and/or hardware, and is preferably configured in an electronic device, such as an autonomous vehicle or an intelligent driving vehicle. As illustrated in FIG. 1, the method specifically includes the following steps.

At block S101, a circular-scanning stitched image around a vehicle is obtained.

In detail, fisheye cameras are set around the vehicle, for example, four fisheye cameras are set at the front, back, left, and right of the vehicle respectively to collect images around the vehicle in real time, and then, the circular-scanning stitched image is obtained by stitching the images.

The circular-scanning stitched image stitched from the images may cover a 360-degree view around the vehicle, thus a wider field of view is obtained. If any one of the fisheye cameras fails, images collected by the other three fisheye cameras may still be stitched into an image for detection, which does not cause failure of the detection function, such that the robustness is well. Since the fisheye cameras of the vehicle are basically installed toward the ground, the cameras could easily obtain images of the ground around the vehicle, which are particularly suitable for detecting natural locating elements on the ground. In addition, the detection based on the circular-scanning stitched image eliminates influences of fisheye distortion, internal and external parameters and installation location of the camera and has a good generalization.

At block S102, the circular-scanning stitched image is detected to determine at least one locating element existing on the ground around the vehicle and a semantic type to which each pixel on the circular-scanning stitched image belongs.

In order to avoid waste of labor costs caused by large-scale reconstruction of the scene and artificially customized locating identifiers, and the problem of inability to mass production, the embodiments of the present disclosure use a natural element that naturally exists on the ground around the vehicle as the locating element. For example, the locating element may include at least one of a parking space, a parking space number, a lane line, a ground arrow, a speed bump, and a sidewalk. The natural locating element is naturally present, can be used as locating elements without the need to modify the site, and plays the same role as the artificially customized locating element.

Certainly, the embodiments of this disclosure are not limited to the type of locating element described above. Other natural elements that exist on the ground could also be detected and identified as locating elements in the embodiments of the disclosure, which is not limited herein.

The detection of locating element may be executed based on a deep neural network. Therefore, in an embodiment, detecting the circular-scanning stitched image to determine at least one locating element existing on the ground around the vehicle and the semantic type to which each pixel on the circular-scanning stitched image belongs includes: detecting the circular-scanning stitched image by using a pre-trained deep neural network model, and performing semantic segmentation on each pixel on the circular-scanning stitched image to determine information of the at least one locating element existing on the ground around the vehicle and the semantic type to which each pixel on the circular-scanning stitched image belongs.

The model could adopt one-stage anchor-free (no candidate box) multi-task joint deep neural network algorithm in object detection, which may output various objects at the same time by only performing one network model operation. Moreover, the model applies feature maps of different scales to predict for locating elements of different sizes in the circular-scanning stitched image. A small feature map has a large receptive field and is suitable for predicting a large target object, such as a parking space, a sidewalk, etc. A large feature map has more detailed features, which is suitable for predicting a small object and a key point, an edge and other details of an object, such as a lane line, an arrow corner or the like. Therefore, by performing object detection on feature maps of different scales, a multi-task joint detection effect is achieved.

In addition, the model could also implement the semantic segmentation, that is, perform the semantic segmentation on each pixel in the circular-scanning stitched image, and identify the semantic type of each pixel, for example, foreground or background, and further which type in the foreground the pixel belongs, for example, a parking space or a parking space number. Thus, the information of the at least one locating element existing on the ground around the vehicle and the semantic type to which each pixel on the circular-scanning stitched image belongs are determined.

At block S103, matching and fusion are performed on the at least one locating element based on the semantic type to obtain a locating element detection result.

In order to improve an accuracy of the locating element detection, in the embodiment of the disclosure, the locating element is detected on the one hand, and the semantic segmentation is performed on the other hand, the semantic types of the locating element and the pixel at the same position as the locating element (i.e., the position of the pixel in the image corresponds to that of the locating element) are matched based on the semantic segmentation result. If the semantic types are inconsistent, it indicates that there is a difference in the detection result and a fusion needs to be executed, and the fused result is more accurate. For example, the semantic segmentation result may be selected as the final detection result, or the detection result and the semantic segmentation result may be weighted and fused to obtain the final result, the embodiment of the present disclosure does not impose any limitation on the fusion method.

It should be noted that the matching and fusion based on the semantic type may avoid the accuracy problem caused by using a single model for detection, so that the detection accuracy after fusion is higher, and the influence of noise could be avoided. Moreover, for locating element without complete model detection, the effect of semantic segmentation is more robust. Therefore, the matching and fusion based on the semantic type may enable more complete detection of the locating element.

The technical solution of the embodiment of the present disclosure takes the circular-scanning stitched image as an input to detect a naturally existing object on the ground around the vehicle as the locating element, and performs matching and fusion on the locating element based on semantic information of the pixels, which not only avoids the problem of limited vision of an ordinary sensor without any field end modification and arrangement, but also improves the accuracy and robustness of the locating element detection simultaneously.

Figure 2:
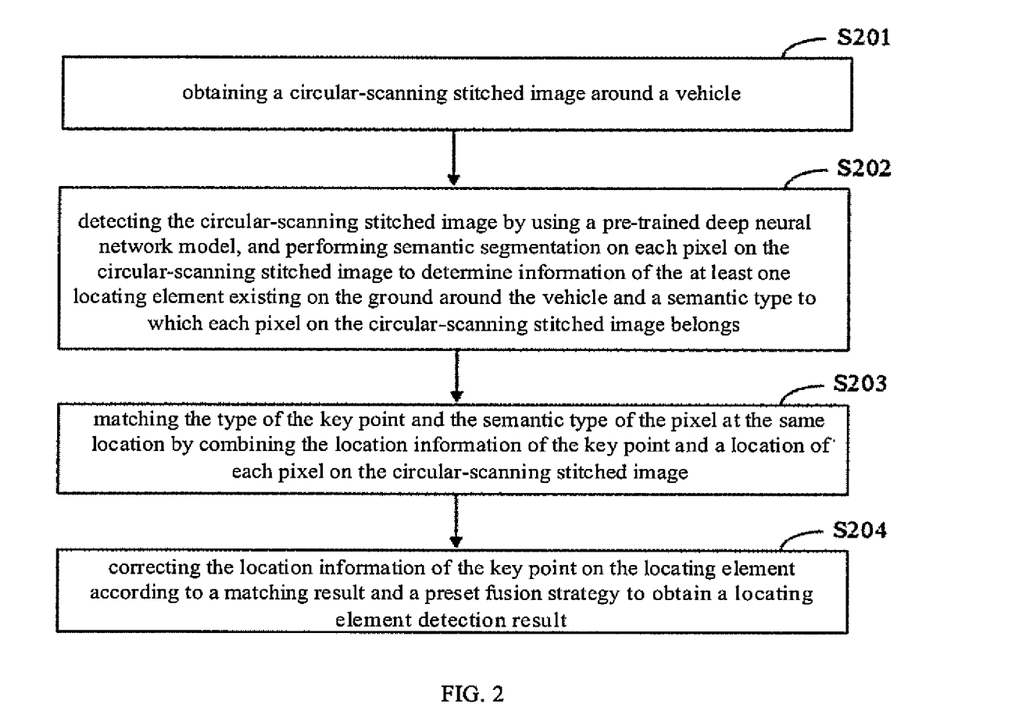
FIG. 2 is a flowchart of a locating element detection method according to Embodiment 2 of the present disclosure.

FIG. 2 is a flowchart of a locating element detection method according to Embodiment 2 of the present disclosure. This embodiment is further optimized on the basis of the foregoing embodiments. As illustrated in FIG. 2, the method specifically includes the following steps.

At block 201, a circular-scanning stitched image around a vehicle is obtained.

At block 202, the circular-scanning stitched image is detected by using a pre-trained deep neural network model, and semantic segmentation is performed on each pixel on the circular-scanning stitched image to determine information of at least one locating element existing on the ground around the vehicle and a semantic type to which each pixel on the circular-scanning stitched image belongs.

The information of the locating element includes at least a type and location information of the locating element, and a type and location information of a key point on the locating element.

The type of the locating element includes, for example, a parking space, a parking space number, a lane line, a ground arrow, a speed bump, a sidewalk or the like. The location information includes, for example, a location of a detection box of the locating element. Key point may be predetermined before model training, which represent feature points on different type of locating elements, for example, corner points of the parking space, vertex on the left side of the parking space, or points on an edge of the lane line may be selected. The embodiment of the present disclosure does not make any limitation on the selection of key points on different types of locating elements.

The detection of the locating element and the detection of the key point are implemented by a multi-task joint deep neural network algorithm model. Alternatively, on the basis of object classification and location regression of the model, the embodiment of the present disclosure also adds a detection network branch for the target key point, thereby further improving the accuracy of the location regression in subsequent processing. That is, the deep neural network model includes a locating element detection branch and a key point detection branch, the locating element detection branch is configured for object classification and key point location regression for the locating element, and the key point detection branch is configured for key point detection.

Combining with the key point detection technology, the key point detection branch is arranged in the network to precisely match the regressed key point locations, and more accurate location information of the key point is determined through fusion.

In detail, the locating element detection branch may determine a locating element detection box through detection, identify the type of the locating element, and obtain the location of at least one key point on the locating element through location regression in the detection box. Since the accuracy of the location obtained by the key point detection is often greater than the accuracy of the key point position calculated by the location regression, the embodiment of the present disclosure uses the key point detection branch to perform the key point detection, and then, the key point obtained by the location regression is fused with the key point obtained by the key point detection, and the location information of the key point on the locating element is finally determined to improve the accuracy of the location of the key point finally determined.

At block 203, the type of the key point and the semantic type of the pixel at the same location as the key point are matched by combining the location information of the key point and location of each pixel on the circular-scanning stitched image.

At block 204, the location information of the key point on the locating element is corrected according to a matching result and a preset fusion strategy to obtain a locating element detection result.

When the type of the key point does not match the semantic type of the pixel at the same position, it indicates that the detected locating element and the key point thereof are not accurate. Therefore, a fusion strategy based on the semantic segmentation result is used to correct the location information of the key point on the locating element, or it is also possible to perform weighted fusion on the location results of the same type of element at the same location obtained through semantic segmentation and model detection respectively, so as to correct the location information of the key point. Therefore, through matching and fusion, the precise key point location may be finally obtained, and then more precise locating element detection result may be obtained.

The embodiment in the disclosure takes the circular-scanning stitched image as an input to detect a naturally existing object on the ground around the vehicle as the locating element, and performs matching and fusion on the locating element based on semantic information of the pixels, which not only avoids the problem of limited vision of an ordinary sensor without any field end modification and arrangement, but also improves the accuracy of the locating element detection simultaneously by further correcting the location of the key point on the locating element based on the semantic segmentation result of the pixels.

The location of the key point on the locating element is further corrected based on a semantic segmentation result of pixels to further improve the detection accuracy of the locating element, and for incomplete locating elements, the effect of semantic segmentation is better.

Figure 3:
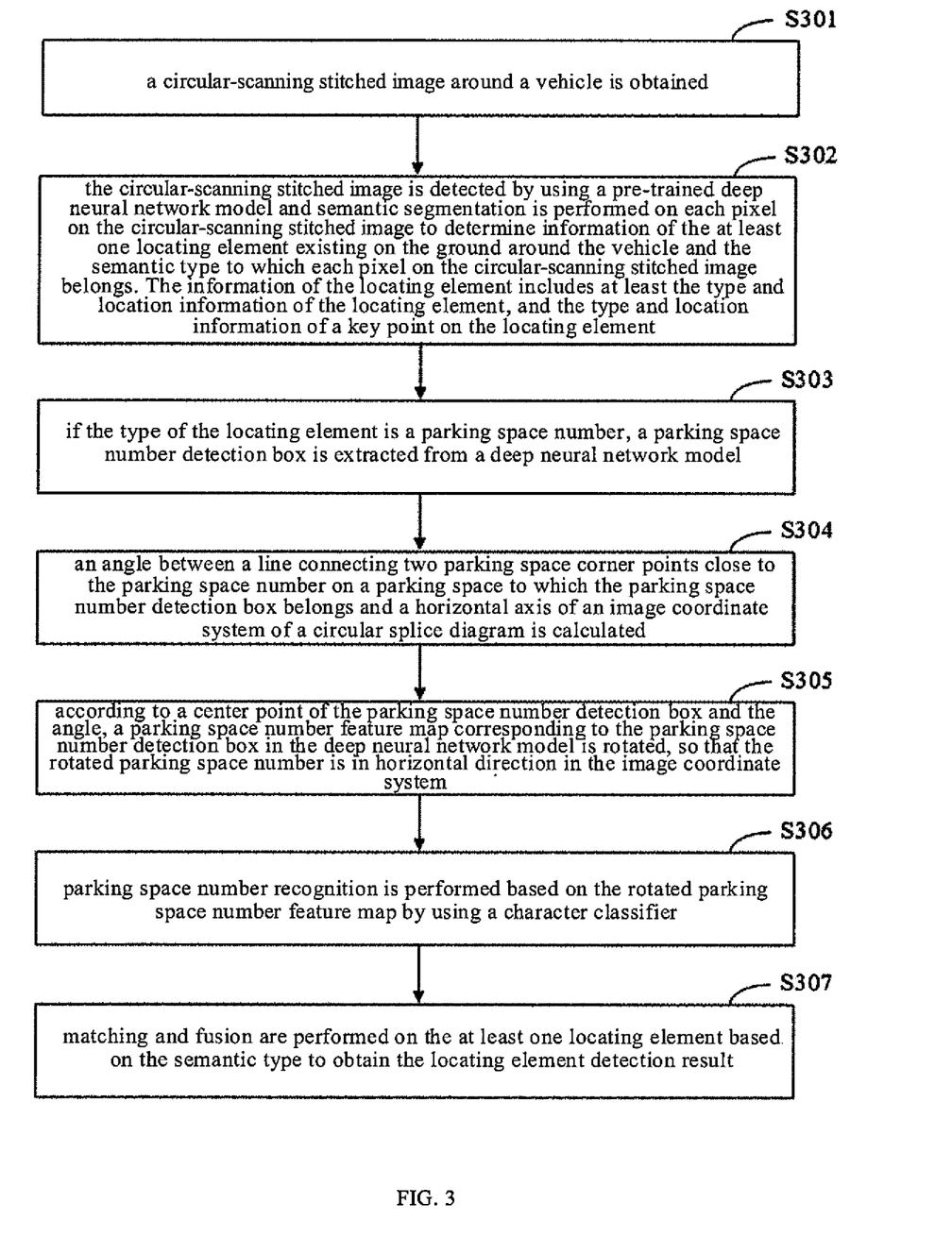
FIG. 3 is a flowchart of a locating element detection method according to Embodiment 3 of the present disclosure.

FIG. 3 is a flowchart of a locating element detection method according to Embodiment 3 of the present disclosure. This embodiment is further optimized on the basis of the foregoing embodiments. As illustrated in FIG. 3, the method specifically includes the following steps.

At block 301, a circular-scanning stitched image around a vehicle is obtained.

At block 302, the circular-scanning stitched image is detected by using a pre-trained deep neural network model, and semantic segmentation is performed on each pixel on the circular-scanning stitched image to determine information of at least one locating element existing on the ground around the vehicle and a semantic type to which each pixel on the circular-scanning stitched image belongs. The information of the locating element includes at least a type and location information of the locating element, and a type and location information of a key point on the locating element.

At block 303, if the type of the locating element is a parking space number, a parking space number detection box is extracted from the deep neural network model.

At block 304, an angle between a line connecting two parking space corner points close to the parking space number on a parking space to which the parking space number detection box belongs and a horizontal axis of an image coordinate system of a circular-scanning stitched image is calculated.

At block 305, according to a center point of the parking space number detection box and the angle, a parking space number feature map corresponding to the parking space number detection box in the deep neural network model is rotated, so that the rotated parking space number is in horizontal in the image coordinate system.

At block 306, parking space number recognition is performed on the rotated parking space number feature map by using a character classifier.

At block 307, matching and fusion are performed on the at least one locating element based on the semantic type to obtain the locating element detection result.

In the above operations between steps at blocks S303-S306, the recognition of the parking space number is realized. The parking space number is very important information among the locating elements on the ground, and is a unique locating element having a global ID. Therefore, by detecting the parking space number as the locating element, and identifying the parking space number, an absolute location of the vehicle in the map could be located, thus the locating accuracy is improved.

In detail, the parking space number detection box is first extracted, and then an angle between a line connecting two parking space corner points close to the parking space number on a parking space to which the parking space number detection box belongs and a horizontal axis of an image coordinate system of the circular-scanning stitched image is determined. Then, the corresponding parking space number feature map of the detection box in the model is rotated according to the angle, so that the corresponding parking space number is rotated to be horizontal in the image coordinate system, and finally the rotated parking space number feature map is input into the character classifier for recognizing the parking space number.

In real life, the parking space number is usually located at the front end of the parking space, that is, on the side that the vehicle passes when the vehicle just enters the parking space, which is on the side of the line collecting two parking space corner points of the parking space close to the parking space number. Moreover, the parking space number is usually labeled in a direction from left to right when a person faces the parking space. Therefore, the deep neural network model identifies the left and right corner points of the parking space close to the parking space number, and then determines the line connecting the two corner points to determine the direction of rotation to avoid a phenomenon that the corresponding parking space number in the rotated feature map is in horizontal, but characters of the parking space number are inverted.

In addition, in the embodiment of the present disclosure, the deep neural network model also includes a branch specifically configured to detect a reflective area of the ground. The detection algorithm of the reflective area is not limited in this application, any algorithm in the related art could be adopted.

That is, the method of the embodiments of the present disclosure further includes: detecting a reflective area existing on the circular-scanning stitched image by using the deep neural network model, and correspondingly, before obtaining the locating element detection result, the method further includes: filtering out locating elements each with location falling in the reflective area based on a detection result of the reflective area.

In indoor and outdoor environments, especially indoor environments, light reflection usually occurs, so the detection result of the locating element in the reflective area is not accurate. Therefore, by detecting the reflective area, the locating elements are filtered out based on the detection result, these locating elements appearing in the reflective area are eliminated, thereby further improving the accuracy of the locating element detection.

It should be noted here that, in an embodiment, the output of the deep neural network model at least includes information on the locating element, information on key point detection, and information on semantic segmentation of pixels and information on the reflective area. This information is outputted to a subsequent processing module, which can realize precise matching of the information on key point detection and the key point on the locating element, so as to improve the accuracy of the key point detection. Furthermore, the matching and fusion may be performed on the key point obtained by matching and the information of the semantic segmentation for the same purpose of improving the accuracy of detection. In addition, the recognition of the parking space number is realized, and the locating elements are filtered out based on the reflective area. Certainly, lane line point screening may be performed on the detected lane line through point clustering, thereby improving an accuracy of the lane line detection. Moreover, the execution sequence of the operations in the above-mentioned subsequent processing module is not limited in the embodiment of the present disclosure.

With the technical solution according to embodiments of the present disclosure, taking the circular-scanning stitched image as an input, a naturally existing object on the ground around the vehicle is detected as the locating element, and matching and fusion are performed on the locating element based on semantic information of the pixels, which not only avoids a problem of limited vision of an ordinary sensor without any field end modification and arrangement, but also improves the accuracy and robustness of the locating element detection. Further, the deep neural network model is used to detect the locating element in the circular-scanning stitched image, which realizes feature point detection based on semantics, and avoids the problem of image feature points being unstable and easily affected by environmental factors in the related art, thus the robustness is improved. By detecting the parking space number, the absolute location of the vehicle could be located, thus the locating accuracy is improved. Finally, for the detection of reflective areas, the accuracy of the locating elements detection is further improved.

Figure 4:
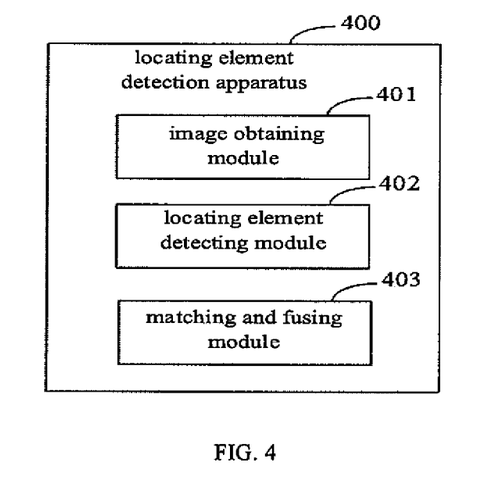
FIG. 4 is a schematic diagram of a locating element detection apparatus according to Embodiment 4 of the present disclosure.

FIG. 4 is a schematic diagram of a locating element detection apparatus according to Embodiment 4 of the present disclosure. This embodiment is applicable for the situation described above. The apparatus could implement the locating element detection method described in any embodiment of the present disclosure. As illustrated in FIG. 4, an apparatus 400 includes: an image obtaining module 401, a locating element detecting module 402 and a matching and fusing module 403.

The image obtaining module 401 is configured to obtain a circular-scanning stitched image around a vehicle.

The locating element detecting module 402 is configured to detect the circular-scanning stitched image to determine at least one locating element existing on ground around the vehicle, and a semantic type to which each pixel on the circular-scanning stitched image belongs.

The matching and fusing module 403 is configured to perform matching and fusion on the at least one locating element based on the semantic type to obtain a locating element detection result.

Alternatively, the locating element includes at least one of a parking space, a parking space number, a lane line, a ground arrow, a speed bump and a sidewalk.

Alternatively, the locating element detecting module 402 is configured to: detect the circular-scanning stitched image by using a pre-trained deep neural network model, and perform semantic segmentation on each pixel on the circular-scanning stitched image to determine information of the at least one locating element existing on the ground around the vehicle and the semantic type to which each pixel on the circular-scanning stitched image belongs.

Alternatively, the information of the locating element includes at least a type and location information of the locating element, and a type and location information of a key point on the locating element.

Alternatively, the matching and fusing module 403 includes: a matching unit and a correcting unit.

The matching unit is configured to match the type of the key point and the semantic type of the pixel at a same location as the key point by combining the location information of the key point and a location of each pixel on the circular-scanning stitched image.

The correcting unit is configured to correct the location information of the key point on the locating element according to a matching result and a preset fusion strategy.

Alternatively, the deep neural network model includes a locating element detection branch and a key point detection branch, and the locating element detection branch is configured to perform object classification and key point location regression on the locating element, and the key point detection branch is configured to perform key point detection, and correspondingly, the location information of the key point on the locating element is determined by fusing the key point obtained by the key point location regression and the key point obtained by the key point detection.

Alternatively, the apparatus also includes a parking space number detecting module, before the matching and fusing module obtains the location element detection result, the parking space number detecting module is configured to: if the type of the locating element is a parking space number, extract a parking space number detection box from the deep neural network model; calculate an angle between a line connecting two parking space corner points close to the parking space number on a parking space to which the parking space number detection box belongs and a horizontal axis of an image coordinate system of a circular-scanning stitched image; according to a center point of the parking space number detection frame and the angle, rotate a parking space number feature map corresponding to the parking space number detection box in the deep neural network model, so that the rotated parking space number is in horizontal direction in the image coordinate system; and perform parking space number recognition based on the rotated parking space number feature map by using a character classifier.

Alternatively, the locating element detecting module 402 is further configured to detect a reflective area existing on a circular-scanning stitched image by using the deep neural network model.

Correspondingly, the apparatus further includes a locating element filtering module, before the matching and fusing module obtains the location element detection result, the locating element filtering module is configured to: filter out locating elements whose locations fall in the reflective area based on a detection result of the reflective area.

The locating element detection for the reflective area is not accurate. Therefore, by detecting the reflective area and using the detection result to filter the locating elements, the accuracy of the locating element detection is further improved.

Alternatively, the image obtaining module 401 includes: an image obtaining unit and an image stitching unit.

The image obtaining unit is configured to obtain images collected by fisheye cameras around the vehicle.

The image stitching unit is configured to stitch the images to generate the circular-scanning stitched image.

The locating element detection apparatus 400 according to the embodiments of the present disclosure could execute the locating element detection method according to any embodiment of the present disclosure, and has the corresponding functional modules for executing the method and beneficial effects. For content not described in detail in this embodiment, reference may be made to the description in any method embodiment of this disclosure.

According to the embodiments of the present disclosure, the present disclosure also provides an electronic device and a readable storage medium.

Figure 5:
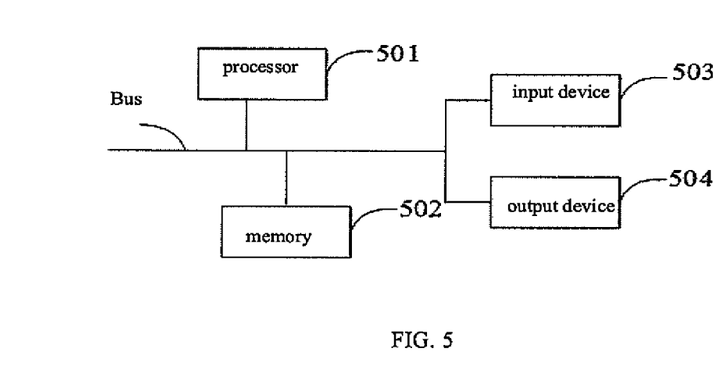
FIG. 5 is a block diagram of an electronic device used to implement the locating element detection method according to an embodiment of the present disclosure.

FIG. 5 is a block diagram of an electronic device used to implement the locating element detection method according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown herein, their connections and relations, and their functions are merely examples, and are not intended to limit the implementation of the disclosure described and/or required herein.

As illustrated in FIG. 5, the electronic device includes: one or more processors 501, a memory 502, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 501 is taken as an example in FIG. 5.

The memory 502 is a non-transitory computer-readable storage medium according to the present disclosure. The memory stores instructions executable by at least one processor, so that the at least one processor executes the locating element detection method according to the present disclosure. The non-transitory computer-readable storage medium of the present disclosure stores computer instructions, which are used to cause a computer to execute the locating element detection method according to the present disclosure.

As a non-transitory computer-readable storage medium, the memory 502 is configured to store non-transitory software programs, non-transitory computer executable programs and modules, such as program instructions/modules corresponding to the locating element detection method in the embodiment of the present disclosure (For example, the image obtaining module 401, the locating element detecting module 402 and the matching and fusing module 403 shown in FIG. 4). The processor 501 executes various functional applications and data processing of the server by running non-transitory software programs, instructions, and modules stored in the memory 502, that is, implementing the locating element detection method in the foregoing method embodiment.

The memory 502 may include a storage program area and a storage data area, where the storage program area may store an operating system and application programs required for at least one function. The storage data area may store data created according to the use of the electronic device, and the like. In addition, the memory 502 may include a high-speed random access memory, and a non-transitory memory, such as at least one magnetic disk storage device, a flash memory device, or other non-transitory solid-state storage device. In some embodiments, the memory 502 may optionally include a memory remotely disposed with respect to the processor 501, and these remote memories may be connected to the electronic device through a network. Examples of the above network include, but are not limited to, the Internet, an intranet, a local area network, a mobile communication network, and combinations thereof.

The electronic device for implementing the locating element detection method may further include: an input device 503 and an output device 504. The processor 501, the memory 502, the input device 503, and the output device 504 may be connected through a bus or in other manners. In FIG. 5, for example, the connection is realized through the bus.

The input device 503 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 504 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

With the technical solution according to embodiments of the present disclosure, taking the circular-scanning stitched image as an input, a naturally existing object on the ground around the vehicle is detected as the locating element, and matching and fusion are performed on the locating element based on semantic information of the pixels, which avoids the problem of limited vision of an ordinary sensor without any field end modification and arrangement. Simultaneously, the deep neural network model is used to detect the locating elements in the circular-scanning stitched image, which realizes feature point detection based on semantics, and avoids the problem of image feature points being unstable and easily affected by environmental factors in the related art, thus the robustness is improved. Moreover, the location of the key point on the locating element is further corrected based on the semantic segmentation result of pixels to further improve the accuracy of the locating element detection. By detecting the parking space number, the absolute location of the vehicle could be located, thus the locating accuracy is improved. Finally, with the detection of reflective areas, the accuracy of the locating element detection is further improved.

It should be understood that various forms of processes shown above may be used to reorder, add, or delete steps. For example, the steps described in the present disclosure may be performed in parallel, sequentially, or in different orders. As long as the desired results of the technical solutions disclosed in the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A locating element detection method, comprising:
obtaining a circular-scanning stitched image around a vehicle;
detecting the circular-scanning stitched image by using a pre-trained deep neural network model to determine information of the at least one locating element existing on the ground around the vehicle, and performing semantic segmentation on each pixel on the circular-scanning stitched image to determine the semantic type and location information of each pixel on the circular-scanning stitched image, wherein the information of the locating element comprises at least a type and location information of the locating element, and a type and location information of a key point on the locating element, wherein the key point is predetermined for representing a feature point on the locating element;
matching the type of the key point and the semantic type of the pixel at a same location by combining the location information of the key point and the location information of each pixel on the circular-scanning stitched image; and
correcting the location information of the key point on the locating element based on the location information of the pixel at the same location as the key point according to a matching result and a preset fusion strategy.

2. The method according to claim 1, wherein the locating element comprises at least one of a parking space, a parking space number, a lane line, a ground arrow, a speed bump and a sidewalk.

3. The method according to claim 1, wherein the deep neural network model comprises a locating element detection branch and a key point detection branch, and the locating element detection branch is configured to perform object classification and key point location regression on the locating element, and the key point detection branch is configured to perform key point detection, and the location information of the key point on the locating element is determined by fusing the key point obtained by the key point location regression and the key point obtained by the key point detection.

4. The method according to claim 1, wherein before the obtaining the locating element detection result, the method further comprises:
if the type of the locating element is a parking space number, extracting a parking space number detection box from the deep neural network model;
calculating an angle between a line connecting two parking space corner points close to the parking space number on a parking space to which the parking space number detection box belongs and a horizontal axis of an image coordinate system of a circular-scanning stitched image;
according to a center point of the parking space number detection box and the angle, rotating a parking space number feature map corresponding to the parking space number detection box in the deep neural network model, so that the rotated parking space number is in horizontal direction in the image coordinate system; and
performing parking space number recognition based on the rotated parking space number feature map by using a character classifier.

5. The method according to claim 1, wherein the method further comprises:
detecting a reflective area existing on the circular-scanning stitched image by using the deep neural network model; and
before obtaining the locating element detection result, the method further comprises:
filtering out locating elements whose locations fall in the reflective area based on a detection result of the reflective area.

6. The method according to claim 1, wherein the obtaining the circular-scanning stitched image around the vehicle comprises:
obtaining images collected by fisheye cameras around the vehicle; and
stitching the images to generate the circular-scanning stitched image.

7. An electronic device, comprising:
fisheye cameras around the electronic device, configured to collect images;
at least one processor; and
a memory communicatively connected to the at least one processor; wherein,
the memory stores instructions executable by the at least one processor, and when the instructions are executed by the at least one processor, the at least one processor is caused to implement the locating element detection method, comprising:
obtaining a circular-scanning stitched image around a vehicle;
detecting the circular-scanning stitched image by using a pre-trained deep neural network model to determine information of the at least one locating element existing on the ground around the vehicle, and performing semantic segmentation on each pixel on the circular-scanning stitched image to determine the semantic type and location information of each pixel on the circular-scanning stitched image, wherein the information of the locating element comprises at least a type and location information of the locating element, and a type and location information of a key point on the locating element, wherein the key point is predetermined for representing a feature point on the locating element;
matching the type of the key point and the semantic type of the pixel at a same location by combining the location information of the key point and the location information of each pixel on the circular-scanning stitched image; and
correcting the location information of the key point on the locating element based on the location information of the pixel at the same location as the key point according to a matching result and a preset fusion strategy.

8. The device according to claim 7, wherein the locating element comprises at least one of a parking space, a parking space number, a lane line, a ground arrow, a speed bump and a sidewalk.

9. The device according to claim 7, wherein the deep neural network model comprises a locating element detection branch and a key point detection branch, and the locating element detection branch is configured to perform object classification and key point location regression on the locating element, and the key point detection branch is configured to perform key point detection, and the location information of the key point on the locating element is determined by fusing the key point obtained by the key point location regression and the key point obtained by the key point detection.

10. The device according to claim 7, wherein before the obtaining the locating element detection result, the method further comprises:

if the type of the locating element is a parking space number, extracting a parking space number detection box from the deep neural network model;

calculating an angle between a line connecting two parking space corner points close to the parking space number on a parking space to which the parking space number detection box belongs and a horizontal axis of an image coordinate system of a circular-scanning stitched image;

according to a center point of the parking space number detection box and the angle, rotating a parking space number feature map corresponding to the parking space number detection box in the deep neural network model, so that the rotated parking space number is in horizontal direction in the image coordinate system; and     performing parking space number recognition based on the rotated parking space number feature map by using a character classifier.

11. The device according to claim 7, wherein the method further comprises:

detecting a reflective area existing on the circular-scanning stitched image by using the deep neural network model; and     before obtaining the locating element detection result, the method further comprises:

filtering out locating elements whose locations fall in the reflective area based on a detection result of the reflective area.

12. The device according to claim 7, wherein the obtaining the circular-scanning stitched image around the vehicle comprises:

obtaining images collected by fisheye cameras around the vehicle; and     stitching the images to generate the circular-scanning stitched image.

13. A non-transitory computer-readable storage medium storing computer instructions, wherein the computer instructions are used to make the computer implement the locating element detection method, comprising:

obtaining a circular-scanning stitched image around a vehicle;

detecting the circular-scanning stitched image by using a pre-trained deep neural network model to determine information of the at least one locating element existing on the ground around the vehicle, and performing semantic segmentation on each pixel on the circular-scanning stitched image to determine the semantic type and location information of each pixel on the circular-scanning stitched image, wherein the information of the locating element comprises at least a type and location information of the locating element, and a type and location information of a key point on the locating element, wherein the key point is predetermined for representing a feature point on the locating element;

matching the type of the key point and the semantic type of the pixel at a same location by combining the location information of the key point and the location information of each pixel on the circular-scanning stitched image; and     correcting the location information of the key point on the locating element based on the location information of the pixel at the same location as the key point according to a matching result and a preset fusion strategy.

\* \* \* \* \*